(12) United States Patent  
Minty

(10) Patent No.: US 8,485,210 B2  
(45) Date of Patent: Jul. 16, 2013

(54) WATER SCAVENGING SYSTEM

(75) Inventor: Andrew Minty, Bristol (GB)

(73) Assignee: Airbus Operations Limited, Bristol (GB)

( * ) Notice: Subject to any disclaimer, the term of this patent is extended or adjusted under 35 U.S.C. 154(b) by 853 days.

(21) Appl. No.: 12/449,546

(22) PCT Filed: Mar. 5, 2008

(86) PCT No.: PCT/GB2008/050155
§ 371 (c)(1),
(2), (4) Date: Aug. 13, 2009

(87) PCT Pub. No.: WO2008/110837
PCT Pub. Date: Sep. 18, 2008

(65) Prior Publication Data
US 2010/0024885 A1 Feb. 4, 2010

(30) Foreign Application Priority Data
Mar. 12, 2007 (GB) .................................. 0704726.9

(51) Int. Cl.
*F17D 3/00* (2006.01)
*F16K 17/36* (2006.01)
(52) U.S. Cl.
USPC .................. 137/1; 137/38; 137/45; 244/135 R
(58) Field of Classification Search
USPC ..................... 137/45, 38, 1, 899.2; 244/135 R
See application file for complete search history.

(56) References Cited

U.S. PATENT DOCUMENTS

| 2,433,405 A | * | 12/1947 | Stamm | ............................ 137/45 |
| 2,676,708 A | | 4/1954 | Risk | |
| 2,845,937 A | | 8/1958 | Theophil | |
| 3,079,941 A | | 3/1963 | Cruise et al. | |

(Continued)

FOREIGN PATENT DOCUMENTS

JP 62-194935 8/1987

OTHER PUBLICATIONS

Search Report for GB 0704726.9, date of search Aug. 31, 2007.

(Continued)

*Primary Examiner* — Kevin Lee
(74) *Attorney, Agent, or Firm* — Nixon & Vanderhye P.C.

(57) ABSTRACT

A water scavenging system (1) for removing water from an aircraft fuel tank (2), the water scavenging system comprising: a water line (10); and a valve (20) which is configured to control the flow of water in the water line in response to a change in an effective angle of the valve. In use, the valve opens automatically in response to an increase in the effective pitch of the aircraft during take off and climb. The valve comprises: a pendulum (40); and a valve closure member (46) which is coupled to the pendulum such that a change in the angular position of the pendulum relative to the water line causes the valve closure member to move from a closed position in which the valve closure member impedes the flow of water in the water line to an open position in which water can flow through the valve.

12 Claims, 8 Drawing Sheets

U.S. PATENT DOCUMENTS

| | | |
|---|---|---|
| 3,982,794 A | 9/1976 | Colovas et al. |
| 3,995,710 A * | 12/1976 | Courtot ............................ 137/45 |
| 4,057,603 A | 11/1977 | Irie |
| 4,206,776 A | 6/1980 | Bader |
| 4,756,328 A | 7/1988 | Sherwood |
| 4,799,504 A | 1/1989 | Scragg et al. |
| 4,809,934 A | 3/1989 | Rix |
| 5,285,809 A | 2/1994 | Shimoguri |
| 6,170,470 B1 | 1/2001 | Clarkson et al. |

OTHER PUBLICATIONS

International Search Report for PCT/GB2008/050155 mailed Jun. 12, 2008.

English language Office Action Summary for JP Office Action mailed Nov. 13, 2012 in JP 2009-553218.

\* cited by examiner

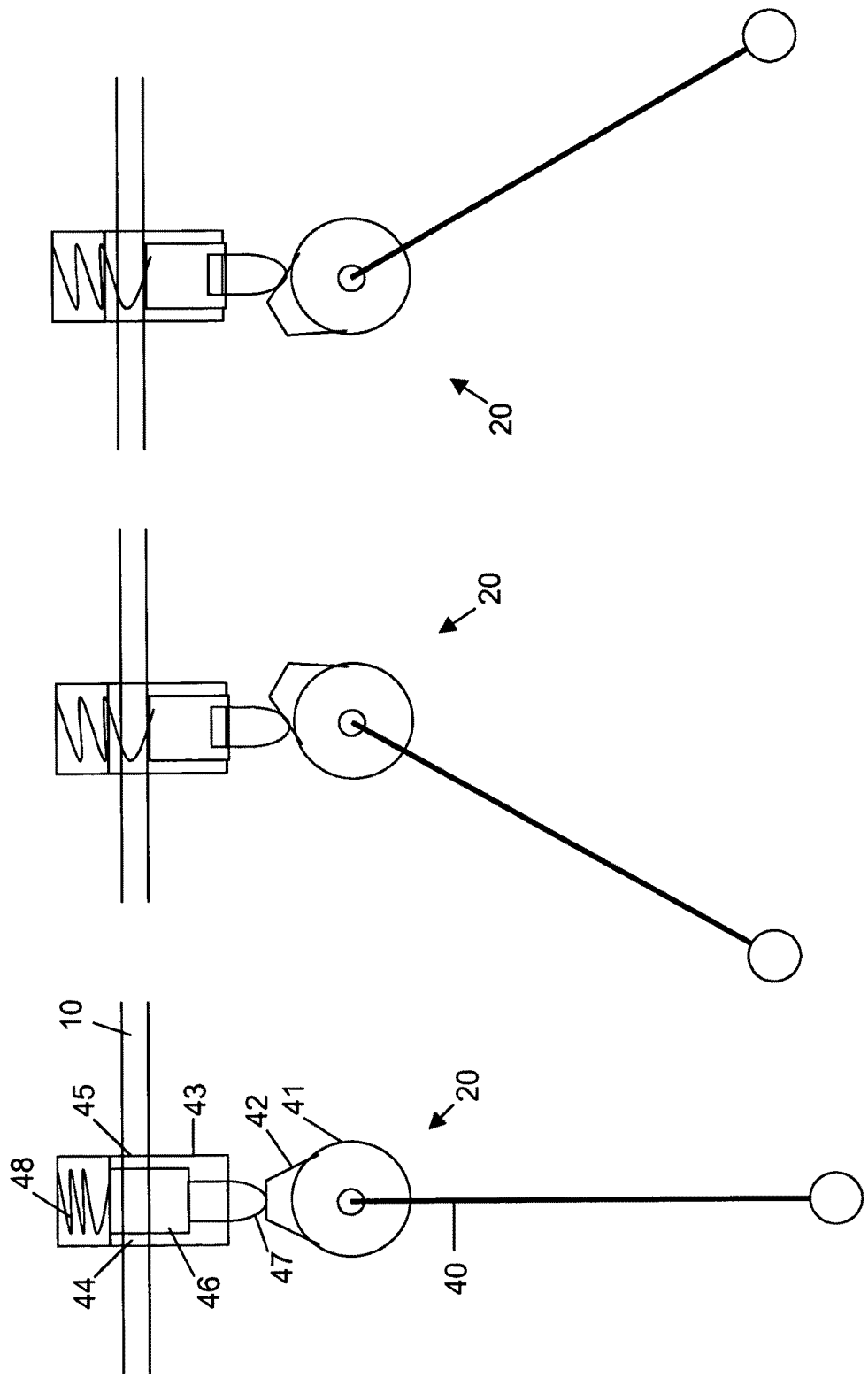

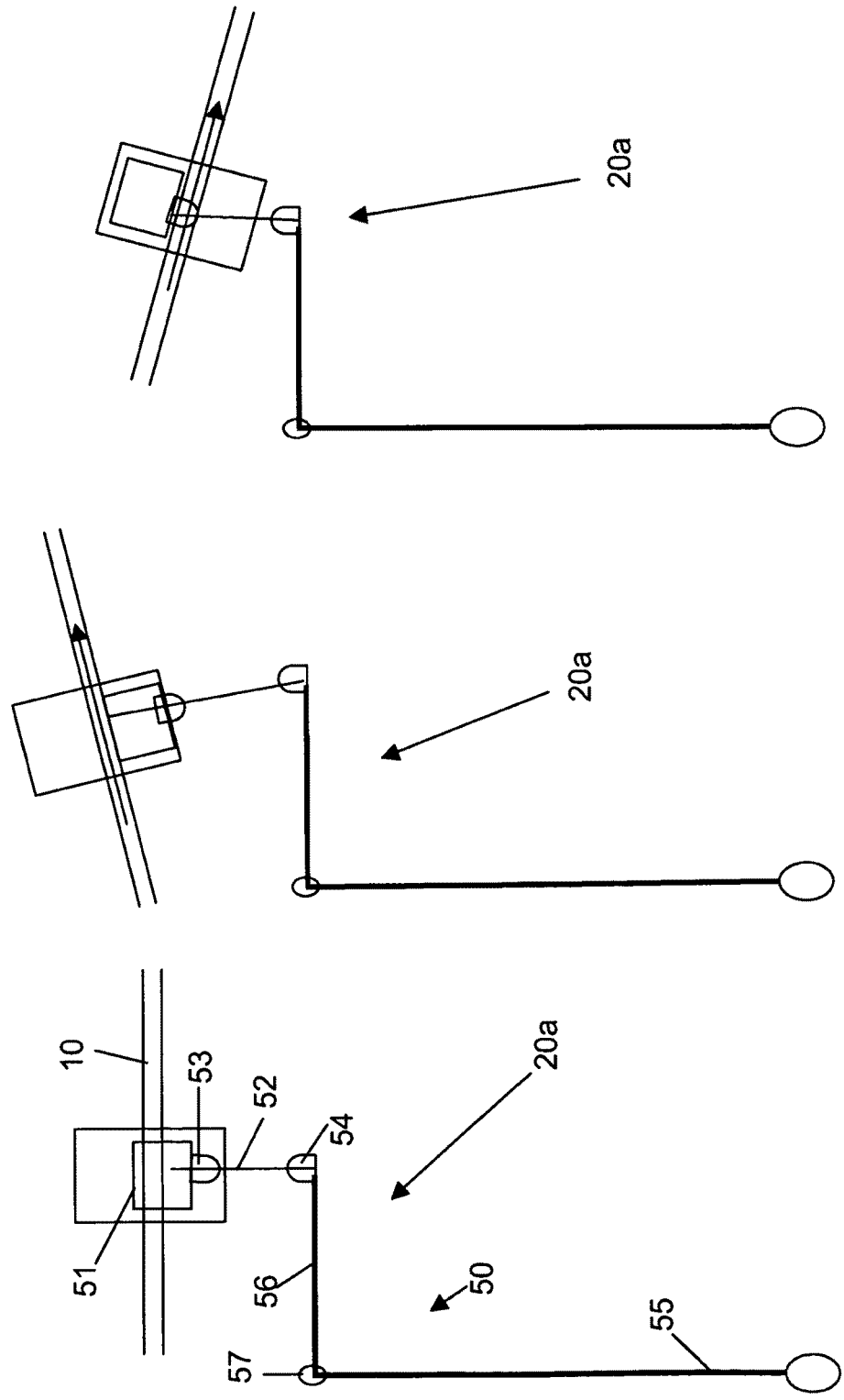

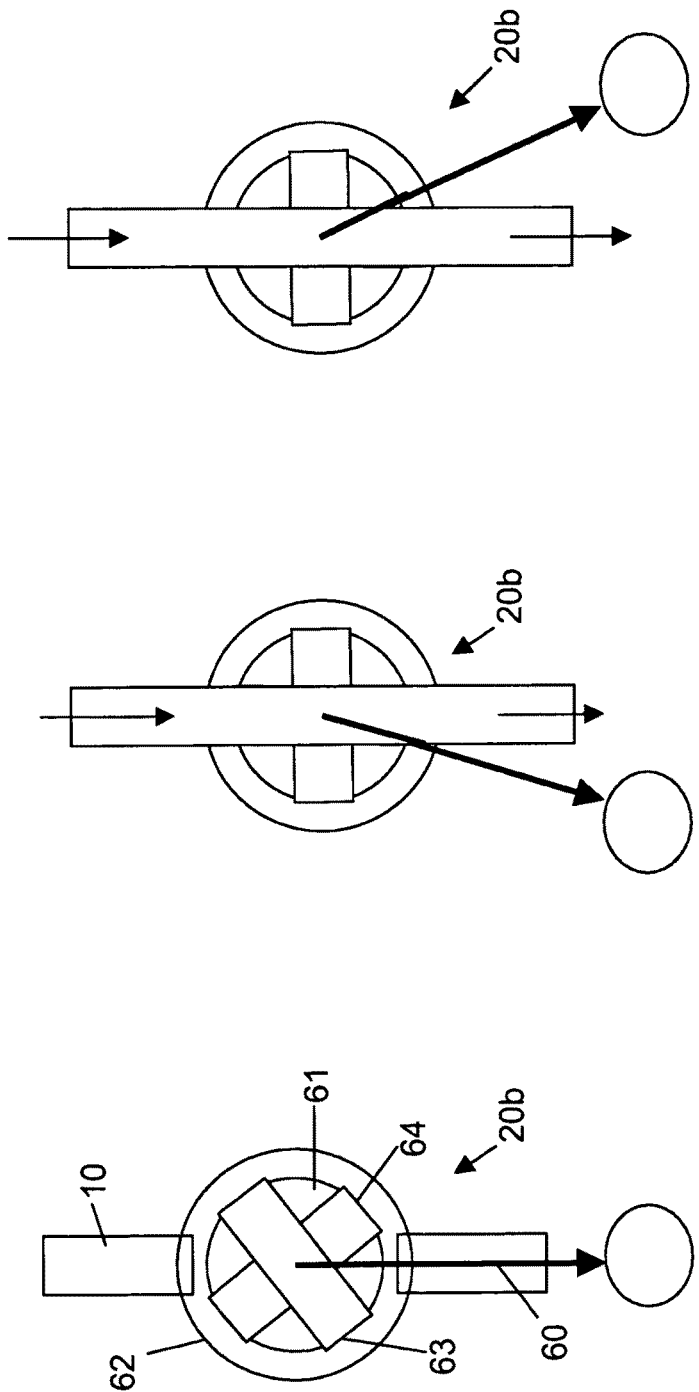

WATER SCAVENGING SYSTEM

This application is the U.S. national phase of International Application No. PCT/GB2008/050155 filed 5 Mar. 2008 which designated the U.S. and claims priority to British Patent Application No. 0704726.9 filed 12 Mar. 2007, the entire contents of each of which are hereby incorporated by reference.

FIELD OF THE INVENTION

The present invention relates to a water scavenging system.

BACKGROUND OF THE INVENTION

A method of removing water from an aircraft fuel tank is described in U.S. Pat. No. 4,809,934. A water scavenge pipe collects water which is dispersed in the fuel immediately upstream of a booster pump. A first problem with this system is that it requires a complex arrangement of venturis and jet pumps. A further problem is that water may be fed to the engine when the engine is operating at a relatively low rate. This may reduce the operating efficiency of the engine. A further problem is that the system may not remove water entirely from the fuel tank during a single flight.

A method of removing water from a fuel tank is described in U.S. Pat. No. 6,170,470. A water line feeds water into an engine from the fuel tank. A valve in a water line is opened when the speed of the engine is above a minimum threshold, because water flowing into the engine when the engine is operating at relatively high speeds will not have a significantly adverse effect on the operational characteristics of the engine. A problem with the method of U.S. Pat. No. 6,170,470 is that an engine speed measuring device must be provided, along with a communication line to the valve. Both of these elements are at risk of failing, and the communication line must be routed out of the fuel tank in a fluid-tight and inherently safe manner.

A particular difficulty associated with an aircraft fuel system is that once the aircraft has taken off the ambient air temperature drops to −30 or −40 deg C. and the water in the fuel freezes after approximately 20 minutes. After the water has frozen it is trapped in the tank until the tank thaws on landing. Therefore if the water is not removed in the first twenty minutes it will gradually accumulate over several flights until it causes problems or is manually drained.

SUMMARY OF THE INVENTION

A first aspect of the invention provides a water scavenging system for removing water from an aircraft fuel tank, the water scavenging system comprising:
a water line; and
a valve which is configured to control the flow of water in the water line in response to a change in an effective angle of the valve.

A second aspect of the invention provides a method of removing water from an aircraft fuel tank, the method comprising opening a valve in response to an increase in an effective pitch of the aircraft to enable water to flow in a water line; and feeding water from the water line into an engine of the aircraft.

Instead of using an engine speed measuring device, the invention provides a valve which opens automatically in response to an increase in the effective pitch of the aircraft during take off and climb. Since the engine speed will be relatively high at take off and climb, this means that the water will be fed into the engine without significantly affecting its operational characteristics. A further advantage of feeding the water into the engine during take off and climb is that it gets rid of the water before it freezes.

Typically the valve is positioned in the water line—either at its inlet, its outlet or an intermediate position along its length.

In the preferred embodiments described below, the water is fed into the engine from a water tank which has been filled by the action of hydrostatic pressure. However the valve may also be employed in a system of the kind described in U.S. Pat. No. 6,170,470, in which the water is fed directly to the engine without an intermediate step of storing in a water tank. In this case, the valve can act as a substitute for the engine speed measuring device used in U.S. Pat. No. 6,170,470.

Preferably the valve comprises:
a pendulum; and
a valve closure member which is coupled to the pendulum such that a change in the angular position of the pendulum relative to the water line causes the valve closure member to move from a closed position in which the valve closure member impedes the flow of water in the water line to an open position in which water can flow through the valve.

In a preferred embodiment the pendulum is coupled to a cam; and the valve closure member comprises a cam follower and a biasing member (such as a coil spring) for biasing the cam follower into engagement with the cam. This enables the opening and closing characteristics of the valve to be easily adjusted by adjusting the shape and/or size and/or position of the cam. The cam may be an integral part of the pendulum axle or pendulum shaft, or may be coupled indirectly to the pendulum.

In its closed configuration the valve may permit some flow, or may substantially prevent the flow of water in the water line.

BRIEF DESCRIPTION OF THE DRAWINGS

Embodiments of the invention will now be described with reference to the accompanying drawings, in which:
FIGS. 6a-6c show the pendulum valve in detail;
FIGS. 7a-7c show a first alternative pendulum valve;
and
FIGS. 8a-8c show a second alternative pendulum valve.

DETAILED DESCRIPTION OF EMBODIMENT(S)

Figure 1:
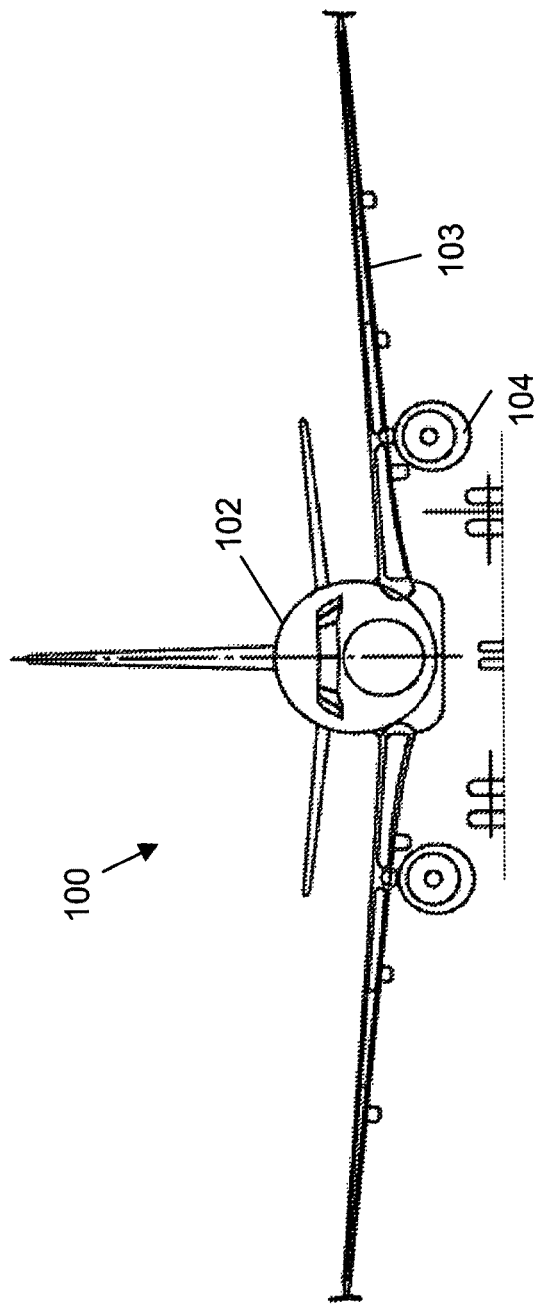
FIG. 1 shows an aircraft.

Referring to FIG. 1, an aircraft 100 comprises a fuselage 102 carrying a pair of wings, the left wing being labelled 103. Each wing carries an engine, the left hand engine being labelled 104 in FIG. 1. Fuel for each engine is stored in a centre tank and one or more wing tanks.

Figure 2:
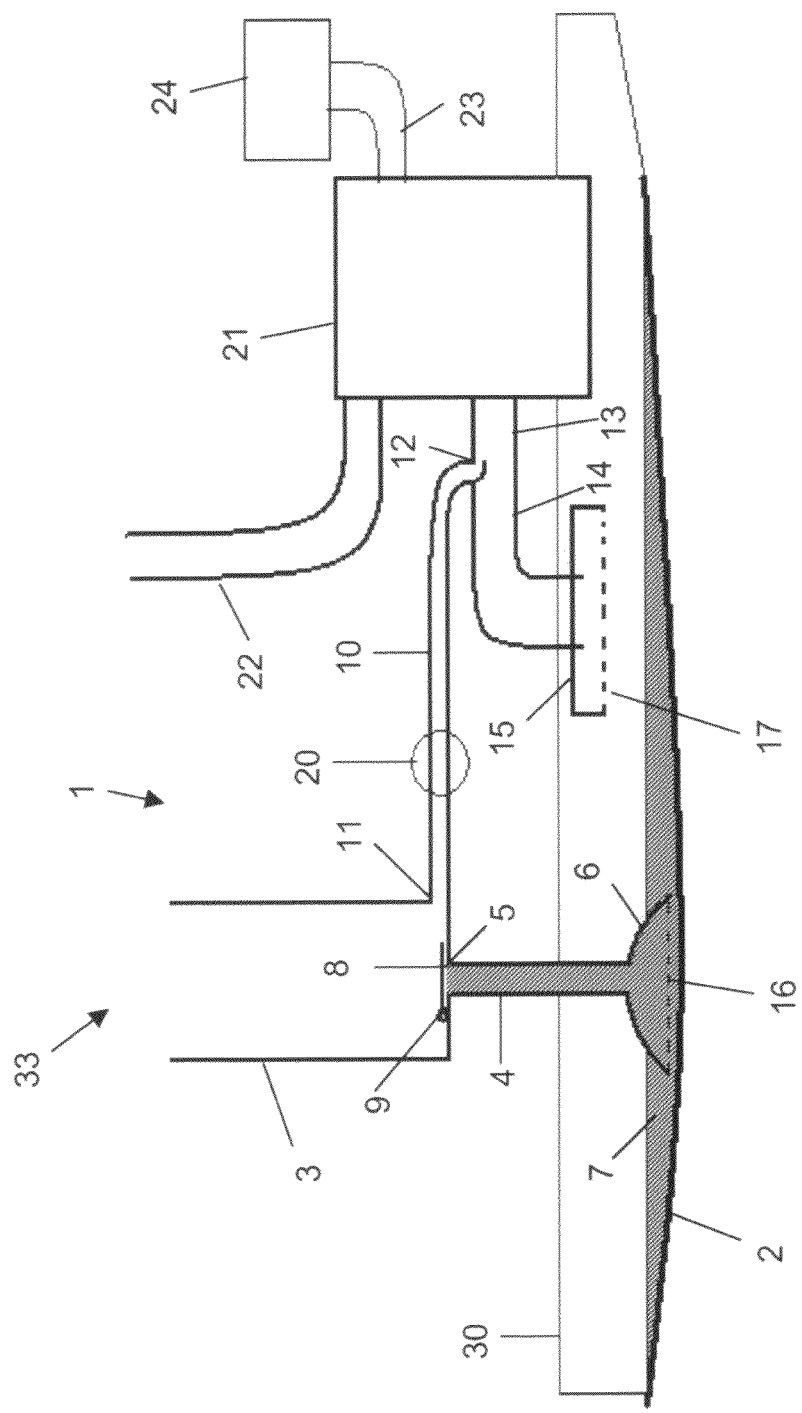
FIGS. 2-5 are schematic views of a fuel tank incorporating a water scavenging system.

A water scavenging system 1 is shown in FIG. 2, installed in one of the wing tanks 2. The water scavenging system comprises a water tank 3; and a water scavenging line 4 which has an outlet 5 in the bottom of the water tank 3, and an inlet 6 immersed in a pool of water 7 at the bottom of the fuel tank 2. The water tank 3 is typically a 60 mm diameter vertical pipe with a length of 0.4 m and an open top.

A non-return valve 8 is mounted to the water tank on a pivot 9 and is shown in its closed position in FIG. 2, in which it closes the outlet 5 of the water scavenging line 4. It will be appreciated that many other types of non-return valve may be used, and the design shown in FIGS. 2-5 is for illustrative purposes only. For instance the non-return valve may comprise a cone closure member mounted on a conical seat, in which the cone translates between its open and closed positions.

Figure 3:
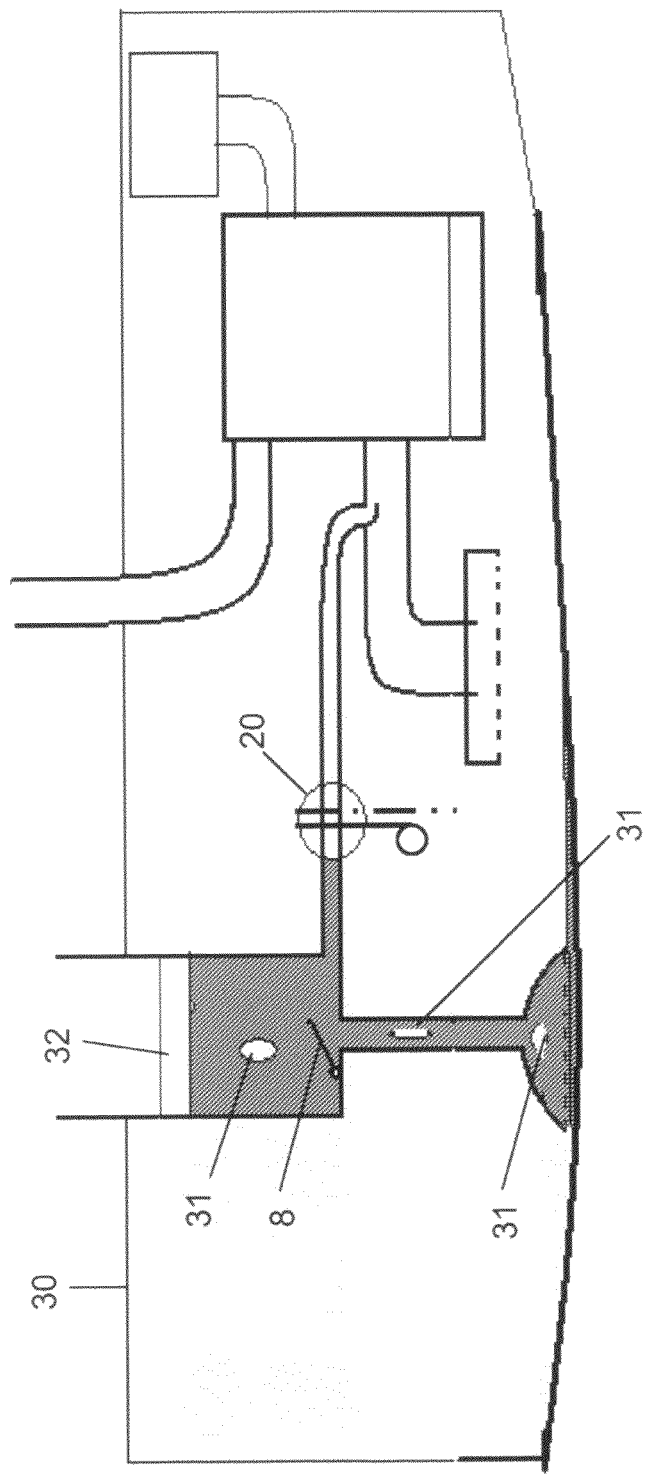
Figure 4:
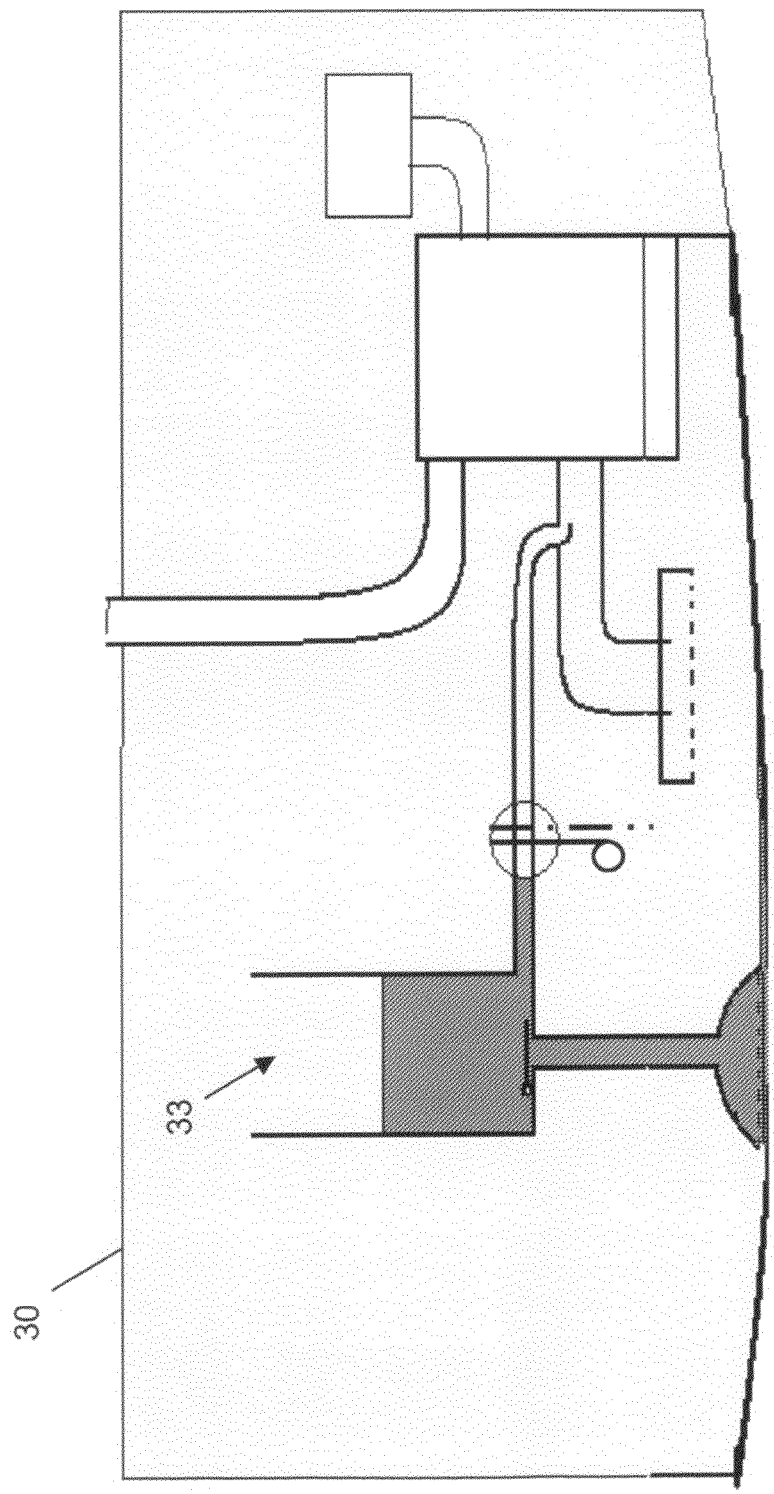

FIGS. 2-4 show fuel 30 in the tank 2 at relatively low, medium and high levels respectively. As the fuel tank is filled, the fuel exerts gravitational hydrostatic pressure on the water 7 pooled at the bottom of the fuel tank. This hydrostatic pressure drives the water up the water scavenging line 4, through the non-return valve 8, and into the water tank 3 against the force of gravity, until the water has been almost completely removed from the bottom of the fuel tank as shown in FIG. 3. As the fuel tank continues to fill, fuel bubbles through the water (three of such fuel bubbles being shown at 31 in FIG. 3) and collects in a layer 32 at the top of the water tank 3.

When the level of fuel reaches the top of the water tank 3, fuel flows into the water tank through the opening 33 at the top of the water tank, filling it as shown in FIG. 4.

Returning to FIG. 2, a water output line 10 extends from the bottom of the water tank 3. The water output line has an inlet 11 in the water tank 3, and an outlet 12 coupled to an pump inlet line 13 in parallel with a fuel uptake line 14. The fuel uptake line 14 has an inlet 15 in the fuel tank above the inlet 6 of the water scavenging line. The inlets 6,15 have filters or strainers 16,17 respectively.

The pump inlet line 13 leads to a pump 21. A pump output line 22 leads from the pump to the engine 104, and a recirculation line 23 leads from the pump to a valve 24 in the fuel tank. The valve 24 can be opened to "de-rate" the pump 21, allowing the pump 21 to continue operating whilst bypassing the pump output line 22.

Figure 5:
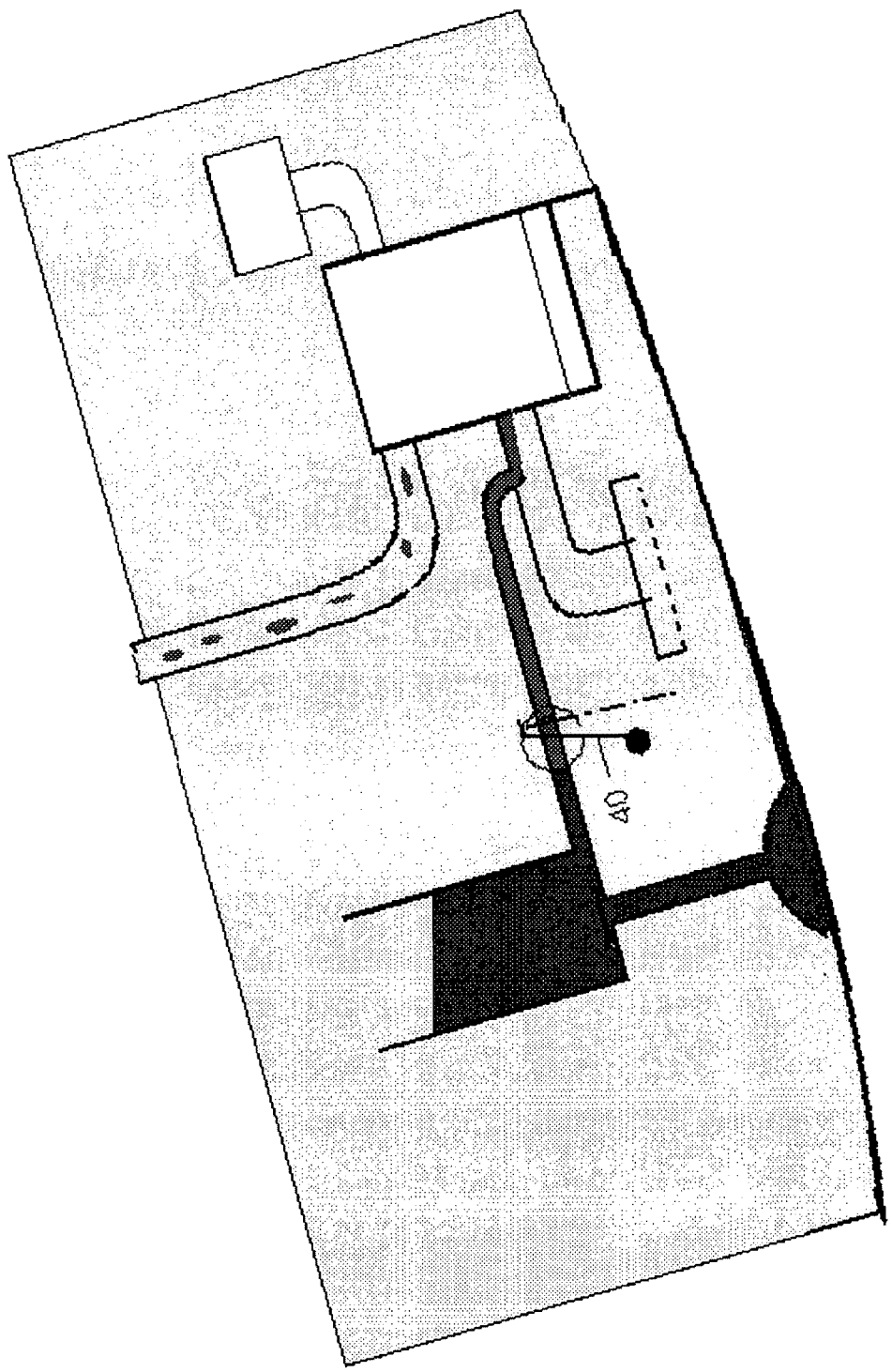

A valve 20 in the water output line 10 is shown schematically in FIGS. 3-5, and in further detail in FIGS. 6a-c.

The valve 20 comprises a pendulum 40 which is pivoted to a support structure (not shown) by an axle 41. The axle 41 carries a cam 42. A chamber 43 in the water output line 10 has an inlet 44 and an outlet 45. A gate 46 is mounted in the chamber 43 and can translate between its closed position shown in FIG. 6a to its open position shown in FIGS. 6b and 6c. In its closed position the gate 46 blocks the inlet 44 and/or the outlet 45 of the chamber 43, and in its open position the gate 46 permits fluid to flow through the valve as shown in FIGS. 6b and 6c.

The gate 46 has a cam follower 47 which is biased against the cam 42 by a coil compression spring 48.

When the aircraft is level, the valve 20 is in its closed configuration shown in FIGS. 3, 4 and 6a. When the "effective pitch" of the aircraft increases above 7 degrees, the valve 20 changes from its closed configuration to its positive open configuration shown in FIGS. 5 and 6b. "Effective pitch" is defined as the combination of physical pitch (that is, the physical pitch angle of the aircraft) combined with the acceleration vector due to forward acceleration.

With the valve 20 open as shown in FIG. 5, the water is driven along the water output line 10 and supplied to the pump 21 by hydrostatic pressure resulting from the gravity head of the water in the water tank. The blockage at the pump inlet would be negligible. Note that the gravity head driving the water along the water output line 10 is relatively large due to the greater density of water compared with fuel. In other words the gravity head is greater than would be the case if the water tank 3 was filled with fuel. Thus the gravity head tends to drive water towards the fuel pump in preference to fuel from the fuel uptake line 14, at least as long as the level of the water in the water tank is above the outlet 12 of the water output line 10. Optionally an inductor pipe (not shown) protruding into the water output line 10 may also be provided. This provides a slight restriction in the water output line 10 and tends to enhance the flow due to the Venturi effect.

Note that the arrangement shown in FIGS. 2-5 is schematic, and the water tank 3 may be adjusted to be directly above the outlet 12 of the water output line 10, if required to give sufficient gravity head at all desired angles of pitch, and all levels of water in the water tank.

Note also that the water tank 3 is designed to be relatively tall and narrow so as to maximise the gravity head. More specifically, the inverse aspect ratio (which we define herein as $H/\sqrt{A}$, where H is the height of the water tank and A is its mean cross-sectional area) is relatively high. For instance in the case of a cylindrical water tank with a 60 mm diameter and a length of 0.4 m, the inverse aspect ratio of the water tank is approximately 7.5.

If the water tank 3 is subjected to negative gravity forces, then the water may empty out of the opening 33 at the top of the water tank 3 into the fuel tank 2. However, since the water tank 3 is relatively small (having a capacity of the order of one liter compared with the fuel tank 2 which has a capacity of the order of 8,000 liters) this should not affect performance. Also, any water which empties in this manner will be picked up at the next refuel.

The water tank 3 is sized to give a 0.5 liter flow in the two to three minutes during take off and climb. The resulting water concentration to the engine is approximately 2500 ppm during this phase.

After take off and climb, the valve 24 is opened to "de-rate" the pump 21, and the centre tank pumps take over. At the same time, as the pitch of the aircraft drops below 7 degrees, the valve 20 closes to its closed position shown in FIG. 6b and fuel is input to the pump exclusively through the fuel uptake line 14.

As the aircraft goes "nose down" during descent, the effective pitch of the aircraft drops below −5 degrees, and the valve 20 changes from its closed configuration to its negative open configuration shown in FIG. 6c. At this stage, the water tank 3 may be empty, or may contain a head of fuel above the fuel level in the rest of the fuel tank. Note that there will be little or no water in the water tank 3 (the majority of the water having been fed to the engine previously during take off and climb) but the water tank 3 may contain some fuel. Note that if there was a significant amount of water present in the water tank it would have frozen and may jam the drain valve 20. If the water tank 3 contains fuel, then this fuel will be fed to the engine during descent, emptying the water tank ready for the next refuelling.

A first alternative pendulum valve 20a (which can be used instead of the valve 20) is shown in FIGS. 7a-7c. In this case, instead of employing a cam and cam-follower, the valve comprises a pendulum 50 which is coupled to a gate 51 by an articulated link 52. The pendulum 50 has a vertical arm 55 and a horizontal arm 56 which are fixed with respect to each other, and pivoted to a support structure (not shown) by an axle 57. The link 52 is rotatably coupled to the gate 51 at one end by a pivot 53 and to the horizontal arm 56 of the pendulum 50 at the other end by a pivot 54. The gate 51 is slidably mounted in a chamber 55 which protrudes from the water output line on both upper and lower sides, and is driven by the link 52 between its three operating positions as shown in FIGS. 7a-7c.

A second alternative pendulum valve 20b (which can be used instead of the valve 20 or the valve 20a) is shown in FIGS. 8a-8c. In this case, instead of employing a translating gate, the valve 20b has a closure member which rotates between its open and closed positions.

Specifically, the valve 20b comprises a pendulum 60 mounted on a cylindrical closure member 61 which is housed in a cylindrical chamber 62 in the water output line 10. The closure member 61 has a pair of channels 63,64 which line up with the inlet and outlet of the chamber 62 when the angle of the pendulum relative to the water output line reaches +7 degrees or −5 degrees, as shown in FIGS. 8b and 8c respectively. Note that for ease of illustration the water output line 10, chamber 62 and closure member 61 are shown lying vertically and parallel with the pendulum 60: in practice they will be oriented horizontally and at right angles to the pendulum 60. Also, the angular deviation between the channels 63,64 is exaggerated in FIGS. 8a-8c for ease of illustration. In practice the channels will extend at a narrower angle (and the chamber 62 and closure member 61 will be larger relative to the water output line 10) to give the required operation.

The advantages of the valve 20 shown in FIGS. 6a-6c, compared with the valves shown in FIGS. 7a-7c and 8a-8c are:

1. the opening and closing characteristics of the valve can be easily adjusted by adjusting the shape and/or size and/or position of the cam 42;
2. because the gate 46 has only two operating positions, the chamber 43 is relatively compact;
3. the pendulum can be easily separated from the rest of the valve for maintenance purposes; and
4. if the pitch of the aircraft overshoots (that is, if the pitch increases substantially above +7 degrees, or decreases substantially below −5 degrees or if there is a high acceleration or deceleration) then the operation of the valve is not affected.

In an alternative embodiment (not shown) several water tanks, each with its own respective scavenging line and water output line, may all be coupled in parallel to the engine via a single shared pendulum valve 20.

In a further alternative embodiment (not shown) a thermostatically controlled drain valve may be installed in a line in parallel with the pendulum valve 20, 20a or 2b. The thermostatically controlled valve opens when the temperature drops below 2 deg C. (say), which will occur as the aircraft cruises at altitude. This ensures that all water is removed from the water tank. Optionally the thermostatically controlled valve could replace the "nose down" operation of the pendulum valve 20,20a,20b: that is, the pendulum valve 20,20a,20b may be replaced by a similar pendulum valve with only a positive open position. The thermostatically controlled valve could for example be a wax-type valve as used in car-engine thermostats or a bimetallic spring that opens a valve.

Although the invention has been described above with reference to one or more preferred embodiments, it will be appreciated that various changes or modifications may be made without departing from the scope of the invention as defined in the appended claims.

The invention claimed is:

1. An aircraft having an engine, a fuel tank and a water scavenging system configured to remove water from the fuel tank and feed said water into said engine, the water scavenging system comprising:
    a water line; and
    a valve which is configured to allow the flow of water in the water line in response to an increase of an effective pitch of the aircraft to a predetermined effective pitch.

2. The aircraft of claim 1 wherein the valve comprises:
    a pendulum; and
    a valve closure member is coupled to the pendulum such that a change in the angular position of the pendulum to a predetermined angular position causes the valve closure member to move from a closed position in which the valve closure member impedes the flow of water in the water line to an open position in which water can flow through the valve.

3. The aircraft of claim 2 wherein the valve closure member translates between open and closed positions.

4. The aircraft of claim 1 wherein the valve has a closed configuration in which it substantially prevents the flow of water in the water line.

5. The aircraft of claim 1, wherein said predetermined effective pitch of the aircraft is 7 degrees.

6. A water scavenging system for removing water from an aircraft fuel tank, the water scavenging system comprising:
    a water line; and
    a valve which is configured to control the flow of water in the water line in response to a change in an effective angle of the valve, wherein the valve comprises:
        a pendulum; and
        a valve closure member which is coupled to the pendulum such that a change in the angular position of the pendulum relative to the water line causes the valve closure member to move from a closed position in which the valve closure member impedes the flow of water in the water line to an open position in which water can flow through the valve, wherein the pendulum is coupled to a cam; and wherein the valve closure member comprises a cam follower and a biasing member for biasing the cam follower into engagement with the cam.

7. The system of claim 6 wherein the biasing member comprises a coil spring.

8. A water scavenging system for removing water from an aircraft fuel tank, the water scavenging system comprising:
    a water line; and
    a valve which is configured to control the flow of water in the water line in response to a change in an effective angle of the valve, wherein the valve comprises:
        a pendulum; and
        a valve closure member which is coupled to the pendulum such that a change in the angular position of the pendulum relative to the water line causes the valve closure member to move from a closed position in which the valve closure member impedes the flow of water in the water line to an open position in which water can flow through the valve, wherein the valve closure member is coupled to the pendulum by a link which is rotatably coupled to the valve closure member at one end and rotatably coupled to the pendulum at another end.

9. A water scavenging system for removing water from an aircraft fuel tank, the water scavenging system comprising:
    a water line; and
    a valve which is configured to control the flow of water in the water line in response to a change in an effective angle of the valve, wherein the valve comprises:
        a pendulum; and
        a valve closure member which is coupled to the pendulum such that a change in the angular position of the pendulum relative to the water line causes the valve closure member to move from a closed position in which the valve closure member impedes the flow of water in the water line to an open position in which water can flow through the valve, wherein the valve closure member rotates between its open and closed positions.

10. A method of removing water from an aircraft fuel tank, said aircraft fuel tank mounted in an aircraft, the method comprising:
    opening a valve in response to an increase in an effective pitch of the aircraft to a predetermined effective pitch of the aircraft to enable water to flow in a water line; and
    feeding water from the water line into an engine of the aircraft.

11. The method of claim 10 further comprising closing the valve in response to a decrease in the effective pitch of the aircraft to less than said predetermined effective pitch.

12. The method of claim 10, where in the predetermined effective pitch of the aircraft is 7 degrees.

* * * * *